UNITED STATES PATENT OFFICE.

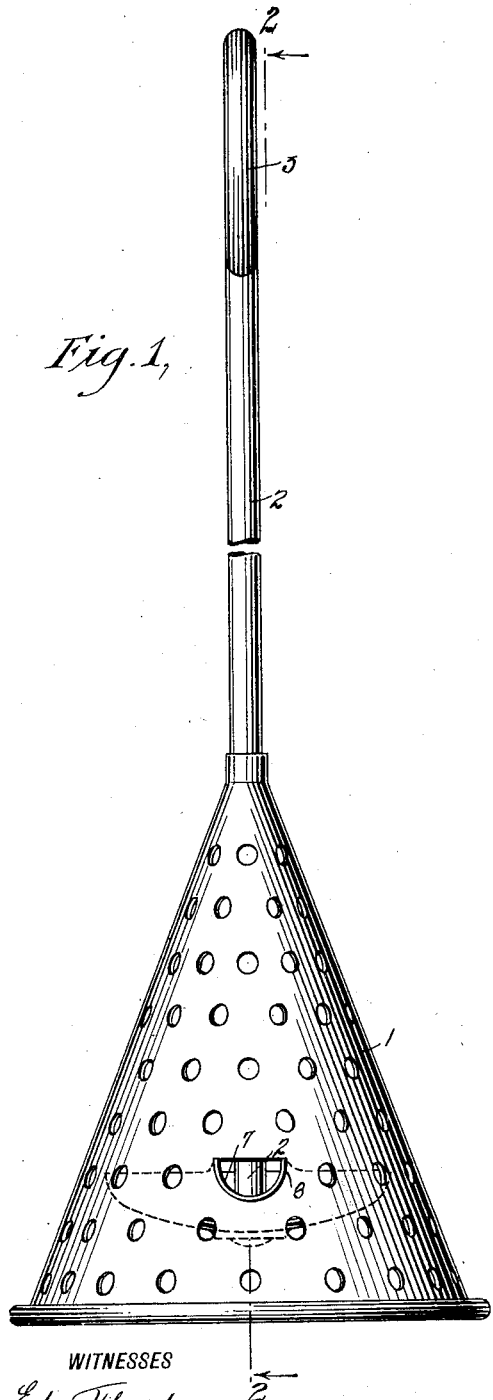
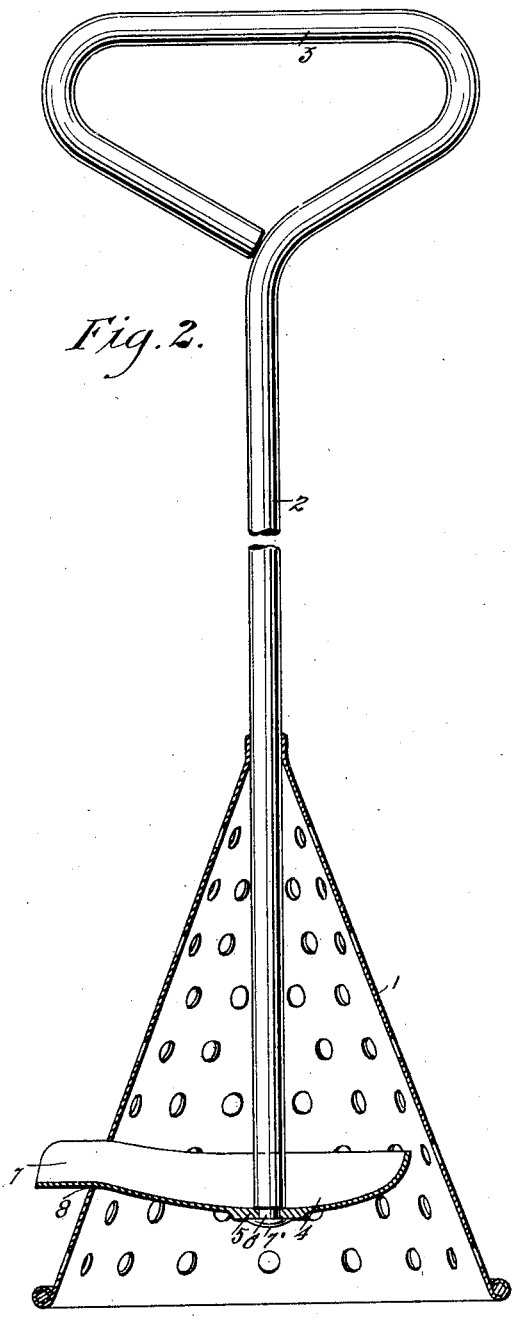

EARL KENT AND GLENN KENT, OF TACOMA, WASHINGTON.

STIRRING AND DIPPING DEVICE.

1,361,766.

Specification of Letters Patent.

Patented Dec. 7, 1920.

Application filed July 6, 1920. Serial No. 394,207.

*To all whom it may concern:*

Be it known that we, EARL KENT and GLENN KENT, citizens of the United States, and residents of Tacoma, in the county of Pierce and State of Washington, have invented a new and Improved Stirring and Dipping Device, of which the following is a full, clear, and exact description.

This invention relates to improvements in stirring and dipping devices, and more particularly to such devices adapted for stirring and dipping from receptacles containing milk and cream, an object of the invention being to provide in a single device means for performing both the stirring and the dipping operation.

Heretofore, it has been common practice to provide a stirring device to stir the milk and cream and then remove a small portion of such milk or cream for testing purposes. The dipper used for removing the cream is frequently used for dipping a small quantity from another receptacle, and if not thoroughly cleansed, will show in the test an imperfect result because of the fact that quantities of milk or cream in one receptacle contain very much higher contents of proteins, fats, etc.

With our improved apparatus, which functions as a stirring device as well as a dipper, such error in test is obviated because the dipper is brought into contact with the entire contents of the receptacle and the surface thereof even though it may contain some milk or cream from a previous receptacle will be so dissipated by the quantity of milk or cream with which it comes in contact that it can not in any way effect a sure test.

A further object is to provide a device of the character stated which can be manufactured and sold at a reasonably low price and which will be strong and durable in use.

With these and other objects in view the invention consists in certain novel features of construction, and combinations and arrangements of parts, as will be more fully hereinafter described and pointed out in the claims.

In the accompanying drawings—

Figure 1 is a broken view in elevation illustrating our invention.

Fig. 2 is a view in longitudinal section on the line 2—2 of Fig. 1.

Our improved device comprises a conical shaped perforated stirrer 1 having a handle rod 2 projecting through the apex of the stirrer and rigidly secured therein. This handle rod 2 is provided at its upper end with a handle 3 and at its lower end within the conical stirrer is secured to a dipper 4. This dipper 4 is preferably provided with a central opening 5 receiving the reduced end 6 of rod 2 and the latter upset or riveted at its extreme end as shown at 7' to secure the rod and the dipper together.

The dipper 4 is made with a spout 7 which projects through an opening 8 in one wall of the conical stirrer 1 so that when the device is removed from a receptacle containing milk, cream, etc., the dipper 4 will contain a small quantity of the liquid which can be readily poured from the spout 7.

In operation, the device is inserted in a can or other receptacle containing milk, cream, and the like, and is agitated so as to thoroughly stir the milk or cream and after the stirring operation is ended, the device is removed in a vertical path from the receptacle and carries with it a portion of the liquid in the dipper 4 as will be readily understood.

Various slight changes might be made in the general form and arrangement of parts described without departing from the invention, and hence we do not limit ourselves to the precise details set forth, but consider ourselves at liberty to make such changes and alterations as fairly fall within the spirit and scope of the appended claims.

We claim:

1. A device of the character stated, comprising a hollow stirrer and a dipper suspended within the stirrer.

2. A device of the character described, comprising a perforated conical stirrer, a handle rod projecting through and secured in the apex of the conical stirrer, a handle on the upper end of the rod, a dipper located within the stirrer and secured to the lower end of the rod, and a spout on the dipper projecting through the wall of the stirrer.

3. A device of the character stated, comprising a hollow perforated stirrer, a dipper located within the stirrer, and a spout on the dipper projecting through the wall of the stirrer.

EARL KENT.
GLENN KENT.